(12) United States Patent　　(10) Patent No.:　　US 9,027,755 B2
Jones　　(45) Date of Patent:　　May 12, 2015

(54) FOOD CONTAINER STACKING DEVICE AND SYSTEM

(71) Applicant: Marlon Jones, Hamden, CT (US)

(72) Inventor: Marlon Jones, Hamden, CT (US)

( * ) Notice: Subject to any disclaimer, the term of this patent is extended or adjusted under 35 U.S.C. 154(b) by 0 days.

(21) Appl. No.: 14/464,913

(22) Filed: Aug. 21, 2014

(65) Prior Publication Data

US 2015/0076167 A1　　Mar. 19, 2015

Related U.S. Application Data

(60) Provisional application No. 61/868,664, filed on Aug. 22, 2013.

(51) Int. Cl.
*B65D 21/02*　　(2006.01)
*B65G 57/00*　　(2006.01)

(52) U.S. Cl.
CPC .......... *B65D 21/0224* (2013.01); *B65G 57/005* (2013.01)

(58) Field of Classification Search
CPC ........... B65D 21/0233; B65D 21/0235; B65D 21/0224
USPC .......................... 206/821, 516, 507, 504, 503; 220/DIG. 13
See application file for complete search history.

(56) References Cited

U.S. PATENT DOCUMENTS

| | | | | | |
|---|---|---|---|---|---|
| 1,838,754 | A | * | 12/1931 | Frame | 206/503 |
| 3,633,962 | A | * | 1/1972 | Erickson | 294/87.2 |
| 3,648,849 | A | * | 3/1972 | Harris et al. | 211/126.12 |
| 3,842,991 | A | * | 10/1974 | Koebel | 206/595 |
| 4,240,551 | A | * | 12/1980 | Osanai | 206/387.15 |
| 4,293,076 | A | * | 10/1981 | Collin | 211/124 |
| 4,496,060 | A | * | 1/1985 | Anderson et al. | 211/124 |
| 4,984,690 | A | * | 1/1991 | King et al. | 206/503 |
| 5,603,403 | A | * | 2/1997 | Sather | 206/325 |
| 6,749,108 | B2 | * | 6/2004 | Naughton et al. | 229/199 |
| 2009/0178946 | A1 | * | 7/2009 | Patstone et al. | 206/503 |
| 2012/0124817 | A1 | * | 5/2012 | Singh | 29/527.2 |

* cited by examiner

*Primary Examiner* — Steven A. Reynolds
*Assistant Examiner* — King M Chu
(74) *Attorney, Agent, or Firm* — Michael A. Blake, LLC (57) ABSTRACT

A food container stacking device comprising: a horizontal member, with a first longitudinal side, a second longitudinal side, a top surface, and a bottom surface, a first corner, second corner, third corner, and fourth corner; the food container stacking device configured to lay on the top surface of a first food container, and further configure to support a second food container on the top surface, thereby allowing for the stacking of the first and second food containers. A food container stacking system, comprising: a first food container; a first food container stacking device configured to lay on the top surface of the first food container, the first food container stacking device comprising: a horizontal member, with a first longitudinal sinusoidal shaped side, a second longitudinal sinusoidal shaped side, a top surface, and a bottom surface, a first corner, second corner, third corner, and fourth corner; a first pin removeably attachable to the first hole, and extending from the bottom surface; a second pin removeably attachable to the second hole, and extending from the bottom surface; a third pin removeably attachable to the third hole, and extending from the bottom surface; a fourth pin removeably attachable to the fourth hole, and extending from the bottom surface, where the first and second pins are configured to lay outside of the perimeter of the first food container, and where the third and fourth pins are configured to lay outside of the perimeter of the first food container, on an opposite side of the first food container.

4 Claims, 7 Drawing Sheets

FIG. 18

FOOD CONTAINER STACKING DEVICE AND SYSTEM

CROSS-REFERENCES

This patent application claims the benefit of provisional patent application Ser. No. 61/868,664, by Marlon Jones, entitled "Food Container Stacking Device", filed on Aug. 22, 2013, and which provisional application is fully incorporated by reference herein.

TECHNICAL FIELD

The present invention relates to a stacking device, and more specifically to a stacking device for use with food containers.

BACKGROUND

It is a common practice in restaurants to prepare large quantities of food in advance of actual meal times and place them in pans which are stored in refrigerators until the food is to be served. The pans, which tend to be of standard sizes and configuration throughout the food service industry, cannot be stacked one on top of the other because the bottom of one pan would come into contact with the food in the pan below. The pans may be stacked in a criss-cross arrangement, but this takes up an excessive amount of space in refrigerators and on countertops.

In addition, stacking food containers such as pans and trays would be helpful in home kitchens whenever one prepares meals for large gatherings, parties, and/or special occasions.

Thus there is a need for a stacking device that can be used with food containers that overcomes the above and other disadvantages.

SUMMARY OF THE INVENTION

The disclosed invention relates to a food container stacking device comprising: a horizontal member, with a first longitudinal side, a second longitudinal side, a top surface, and a bottom surface, a first corner, second corner, third corner, and fourth corner; the food container stacking device configured to lay on the top surface of a first food container, and further configure to support a second food container on the top surface, thereby allowing for the stacking of the first and second food containers.

The invention also relates to a food container stacking system, comprising: a first food container; a first food container stacking device configured to lay on the top surface of the first food container, the first food container stacking device comprising: a horizontal member, with a first longitudinal sinusoidal shaped side, a second longitudinal sinusoidal shaped side, a top surface, and a bottom surface, a first corner, second corner, third corner, and fourth corner; a first pin removeably attachable to the first hole, and extending from the bottom surface; a second pin removeably attachable to the second hole, and extending from the bottom surface; a third pin removeably attachable to the third hole, and extending from the bottom surface; a fourth pin removeably attachable to the fourth hole, and extending from the bottom surface, where the first and second pins are configured to lay outside of the perimeter of the first food container, and where the third and fourth pins are configured to lay outside of the perimeter of the first food container, on an opposite side of the first food container.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
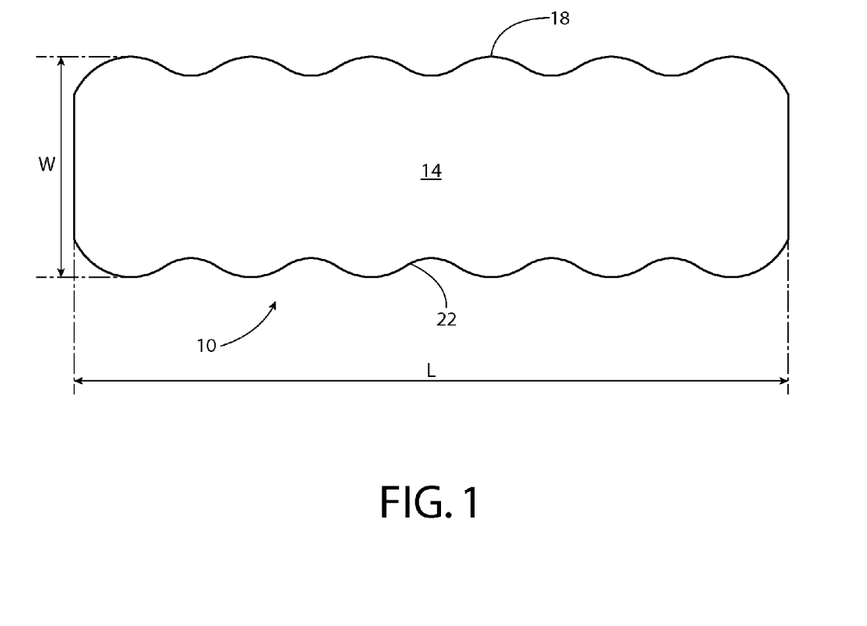
FIG. 1 is a top view of the disclosed food container stacking device.

FIG. 1 is a top view of the disclosed food container stacking device 10. The stacking device 10 comprises a top surface 14. The top surface has a length L and a width W. On both sides 18, 22, along the length, the top surface may have a generally sinusoidal shape. The sides 18, 22 may have other shapes, either flat, triangular, saw tooth, etc. The sinusoidal shape may help one store the devices 10, because a first device 10 can be locked into place with an adjacent device 10, due to the abutting sinusoidal sides acting like mating teeth, thus preventing a device 10 from sliding or moving with respect to an abutting device 10.

Figure 2:
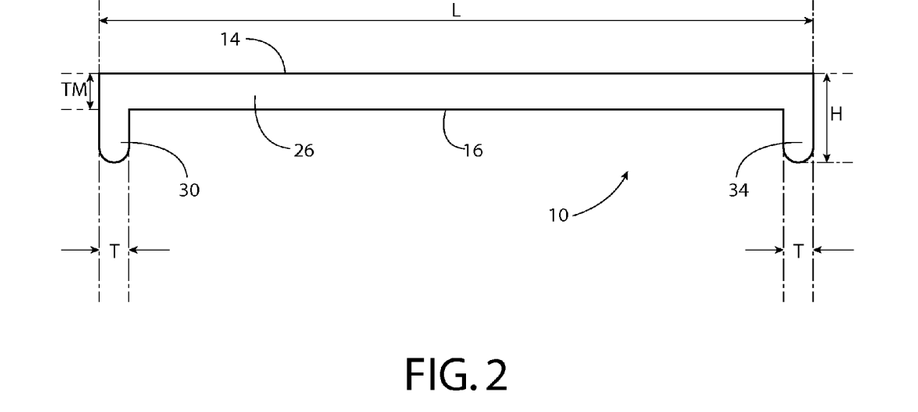
FIG. 2 is a side view of the food container stacking device from FIG. 1.

FIG. 2 is a side view of the disclosed food container stacking device 10. The device 10 comprises a main member 26, and a first member 30 extending downward from the underside 16 of the main member 26, and a second member 34 extending downward from the underside of the main member 26. The device 10 has a height H. The first and second members 30, 34 have a thickness T. The main member 26 may have a main member thickness of TM.

Figure 3:
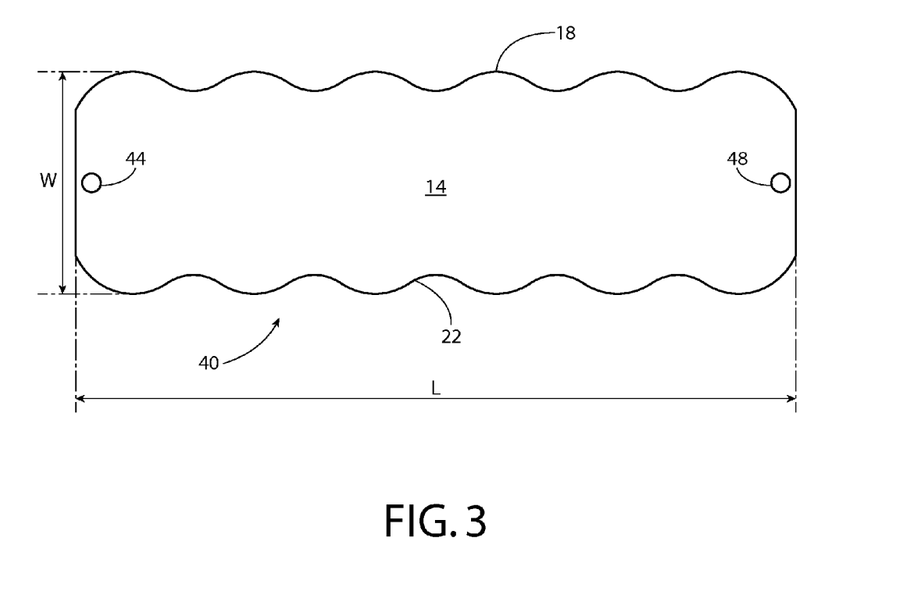
FIG. 3 is a top view of another embodiment of the food container stacking device.
Figure 4:
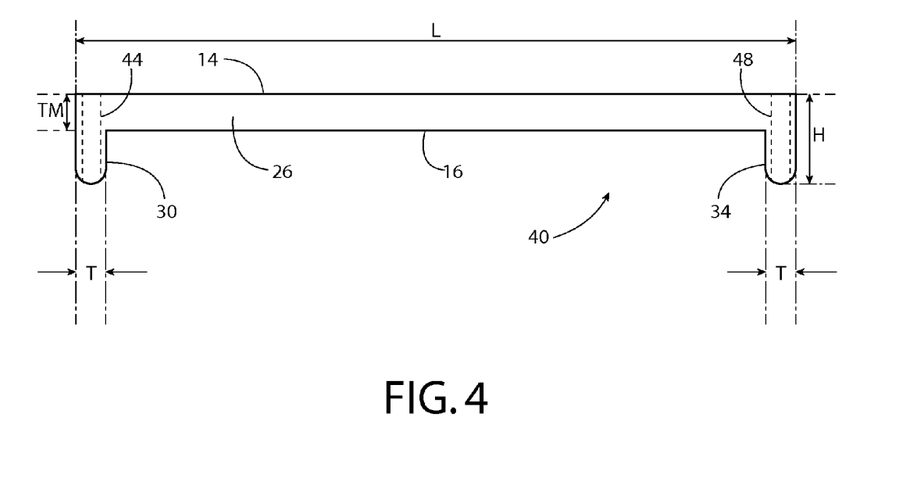
FIG. 4 is a side view of the food container stacking device from FIG. 3.

FIG. 3 is a top view of another embodiment of the disclosed food container stacking device 40. In this embodiment there is a first hole 44 and second hole 48 located at the ends of the food container stacking device 40. FIG. 4 is a side view of the device 40. In this view the holes 44, 48 can be seen in dashed lines. The holes may be used to thread a line such as rope, wire, cable, bungee cord, in order to secure the stacked food containers. In one embodiment, the food containers may be secured by wrapping a line around the stacked containers and through the first and second holes 44, 48 of each stacking device 40.

Figure 5:
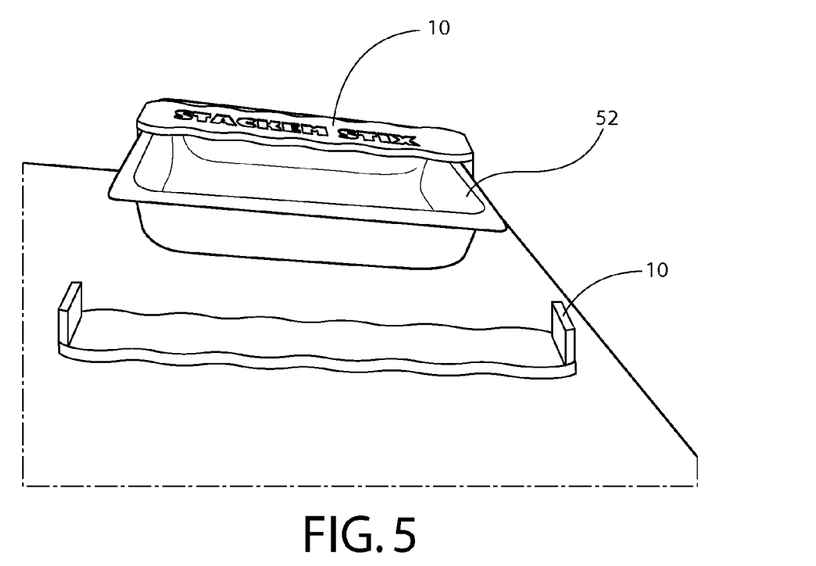
FIG. 5 is a perspective view of a food container and two food container stacking device.
Figure 6:
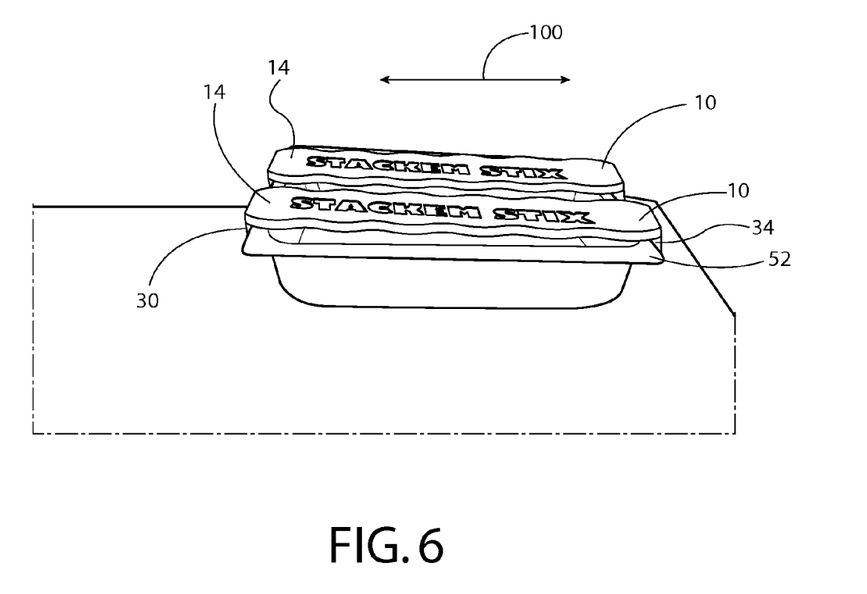
FIG. 6 is a perspective view of the food container from FIG. 5, with two food container stacking devices inserted onto the food container.

FIG. 5 shows two of the devices 10 and one pan 52 or tray. One of the devices 10 is shown properly inserted on the pan 52. FIG. 6 shows both devices 10, 10 properly inserted on the pan 52. Now, a second pan or tray, or other food container can be stacked on the first pan 52, without damaging the food or other material located inside of the pan 52. The other food container will simply sit on the top surfaces 14 of the stacking devices 10, 10. One can see how the first and second members 30, 34 are on the outside of the pan 52. In this way, the first and second members 30, 34 prevent the devices 10 from moving in the direction of the arrow 100, thus tending to keep the device 10 in place with respect to the pan or tray or other food container.

Figure 7:
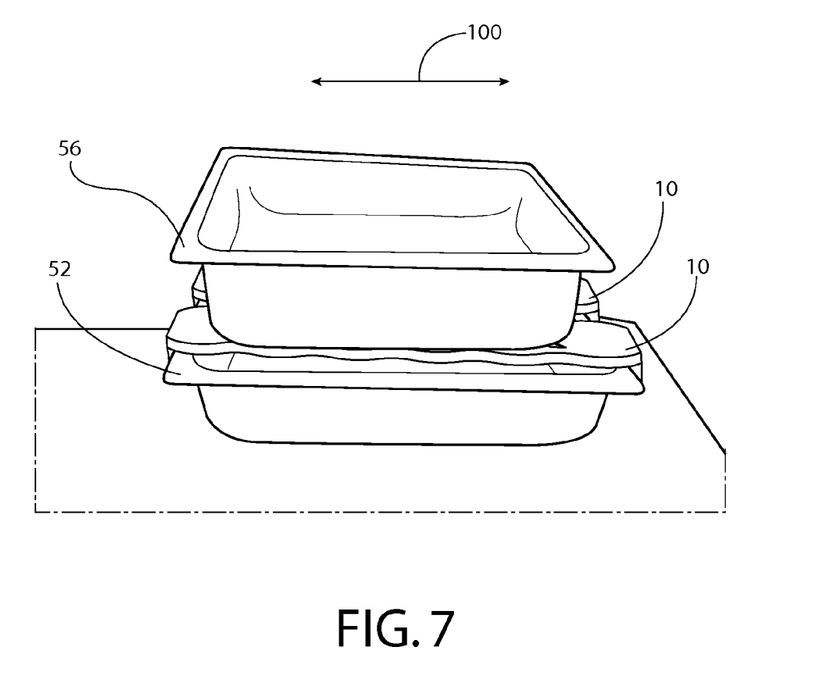
FIG. 7 is a perspective view of the food container from FIG. 6, with a second food container stacked on the food container stacking devices.

FIG. 7 shows a second food container 56 stacked on the stacking devices 10, 10, which are inserted on to a first food container 52. One of ordinary skill will recognize that 3, 4, 5 and more food containers may be stacked using the stacking devices 10.

Figure 8:
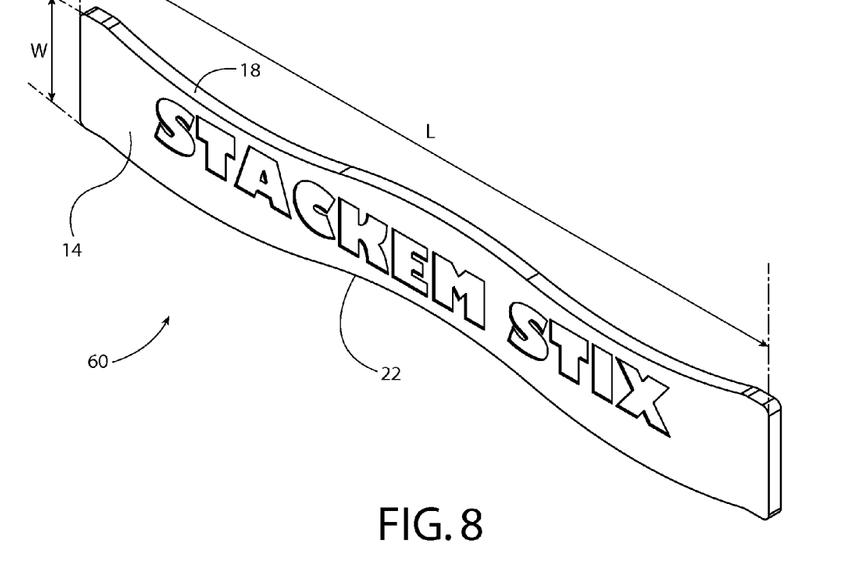
FIG. 8 is a perspective view of another embodiment of the food container stacking device.
Figure 9:
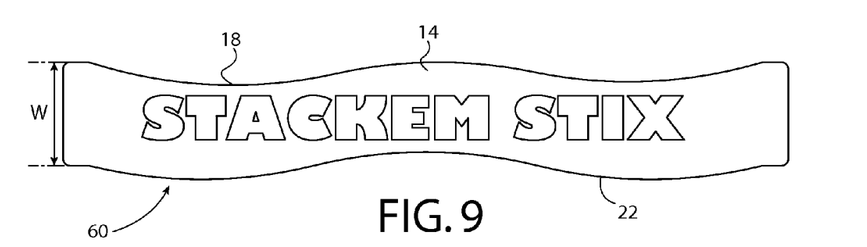
FIG. 9 is a front view of the food container stacking device from FIG. 8.
Figure 10:
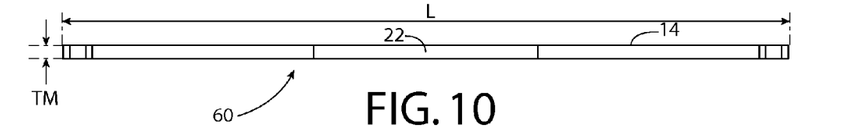
FIG. 10 is a side view of the food container stacking device from FIG. 8.
Figure 11:
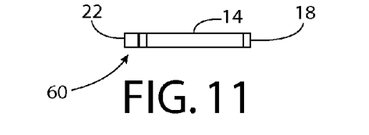
FIG. 11 is an end view of the food container stacking device from FIG. 8.

FIG. 8 shows a perspective view of another embodiment of the disclosed food container stacking device 60. In this embodiment, the sides 18, 22 may have a more gentle sinusoidal shape (i.e. a sinusoidal shape of lower frequency). This shape may be less expensive to manufacture than the shape shown in FIGS. 1 and 2. Further, this embodiment 60 does not have first or second members 30, 34, thus making the device 60 less expensive to manufacture, package, and transport. FIG. 9 is a front view of the food container stacking device 60 from FIG. 8. FIG. 10 is a side view of the food container stacking device 60 from FIG. 8. FIG. 11 is an end view of the food container stacking device 60 from FIG. 8.

Figure 12:
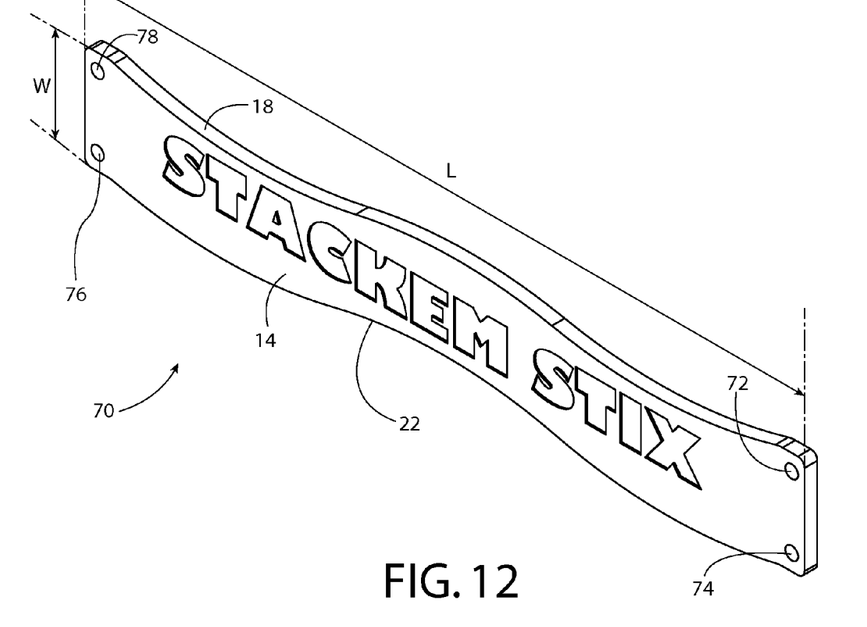
FIG. 12 is a perspective view of another embodiment of a food container stacking device.
Figure 13:
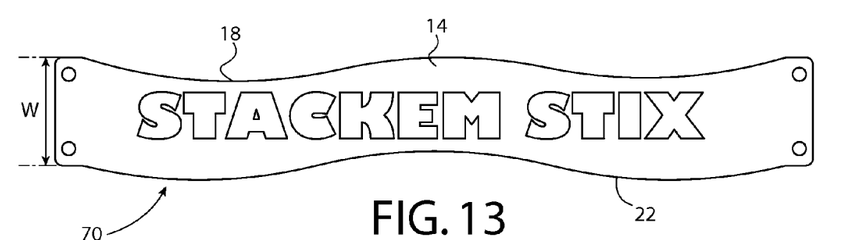
FIG. 13 is a front view of the food container stacking device from FIG. 12.
Figure 14:
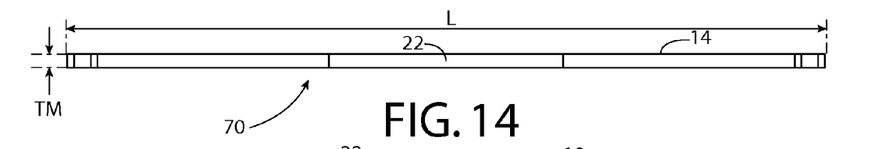
FIG. 14 is a side view of the food container stacking device from FIG. 12.
Figure 15:
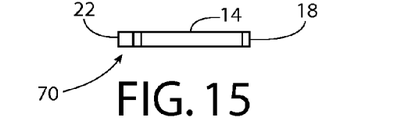
FIG. 15 is an end view of the food container stacking device from FIG. 12.

FIG. 12 shows a perspective view of another embodiment of the disclosed food container stacking device 70. In this embodiment, there are four holes 72, 74, 76, 78 through generally the four corners of the device 70. These holes 72, 74, 76, 78 may remain empty, or may be used for optional pins. FIG. 13 is a front view of the food container stacking device 70 from FIG. 12. FIG. 14 is a side view of the food container stacking device 70 from FIG. 12. FIG. 15 is an end view of the food container stacking device 70 from FIG. 12

Figure 16:
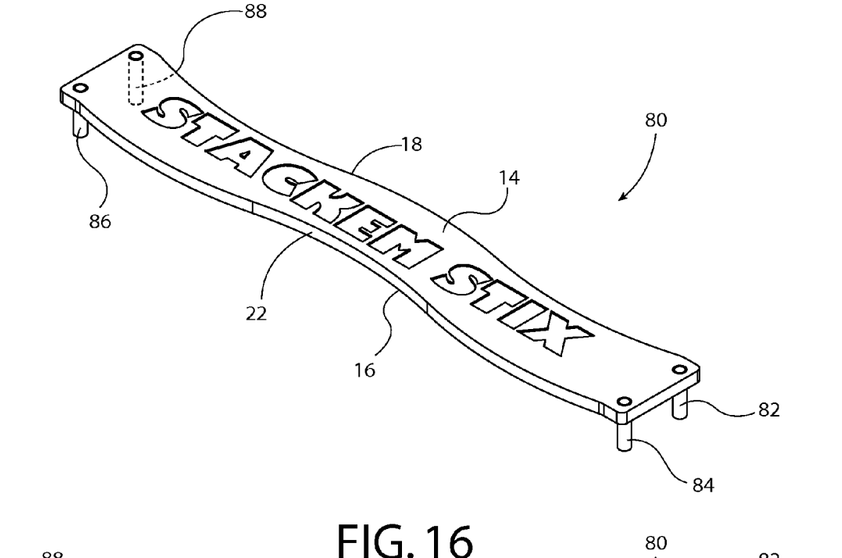
FIG. 16 is a perspective view of another embodiment of the food container stacking device.
Figure 17:
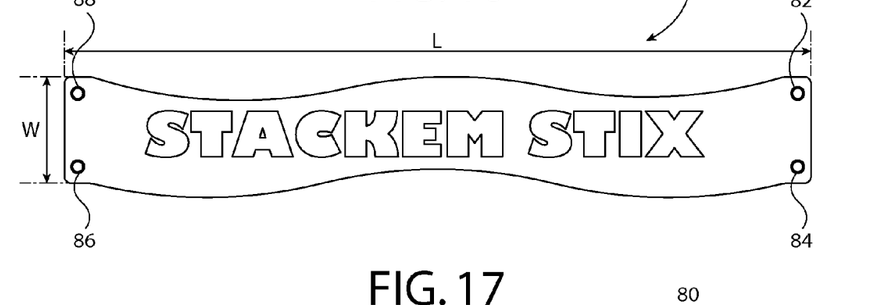
FIG. 17 is a front view of the food container stacking device from FIG. 16.
Figure 18:
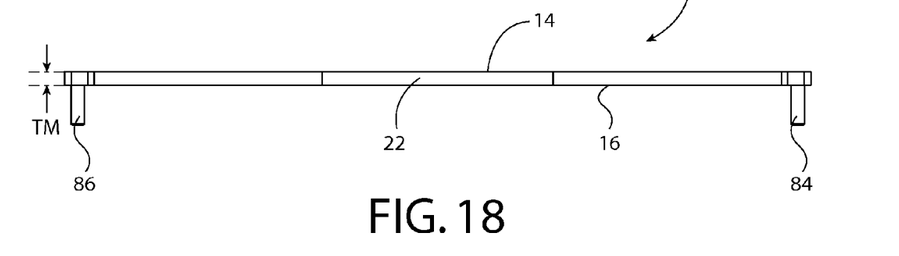
FIG. 18 is a side view of the food container stacking device from FIG. 16.

FIG. 16 shows another embodiment of the disclosed food container stacking device 80. In this embodiment, pins 82, 84, 86, 88 may extend down out of the lower surface 16 of the device 80 at generally the four corners of the device 80. The pins 82, 84, 86, 88 are configured to keep the device 80 from sliding with respect to the food container, much like described with FIGS. 5-7 above. The pins 82, 84, 86, 88 act similarly as the first and second members 30, 34. In one embodiment, the pins 82, 84, 86, 88 may be manufactured installed in the device. In other embodiments, the pins 82, 84, 86, 88 may be come with the device 70, and the user may install the pins 82, 84, 86, 88 into the holes 72, 74, 76, 78. The pins 82, 84, 86, 88 may be configured to be permanently installed in the holes 72, 74, 76, 78, or the pins 82, 84, 86, 88 may be removable from the holes 72, 74, 76, 78, either with interference fit, or with mating threaded surfaces on the pins 82, 84, 86, 88 and the holes 72, 74, 76, 78. FIG. 17 is a top view of the disclosed food container stacking device 80 from FIG. 16. FIG. 8 is a side view of the disclosed food container stacking device 80 from FIG. 16.

In one embodiment, the devices 60, 70, 80 may have a length L of about 14 inches, a width W of about 2 inches, a main member thickness TM of about ¼ inch. The pins 82, 84, 86, 88 may extend from the bottom surface 16 by about ¾ inch. The holes 72, 74, 76, 78 may have a diameter of about ¼ inch.

The stacking devices 10, 40, 60, 70, 80 may be made out of any suitable material, including but not limited to plastic, fiberglass, metal, Pyrex, wood, and glass etc. In addition, in other embodiments, the stacking devices 10 may be coated with a non-stick material, to make cleaning easy. In still other embodiments, the stacking devices 10 may be food grade safe. In still other embodiments, the stacking devices 10 may be made out of materials able to withstand high temperatures such as those found in ovens and/or stove tops. The stacking devices 10 may come in a variety of sizes in order to properly fit on all sorts of different sized food containers, pots, pans, trays, etc. In one embodiment, the lengths L of the devices may range from about 6 inches to about 28 inches, the height H may range from about ½ inch to about 6 inches, the width W may range from about 1 inch to about 3 inches, and the thickness T may range from about ½ inch to about 2 inches.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A food container stacking system, comprising:
   a first food container;
   a first food container stacking device configured to lay on the top surface of the first food container, the first food container stacking device comprising:
      a horizontal member, with a first longitudinal sinusoidal shaped side, a second longitudinal sinusoidal shaped side, a top surface, and a bottom surface, a first corner, second corner, third corner, and fourth corner;
      a first pin removeably attachable to the first hole, and extending from the bottom surface;
      a second pin removeably attachable to the second hole, and extending from the bottom surface;
      a third pin removeably attachable to the third hole, and extending from the bottom surface;
      a fourth pin removeably attachable to the fourth hole, and extending from the bottom surface;
   wherein the first and second pins are configured to lay outside of the perimeter of the first food container, and wherein the third and fourth pins are configured to lay outside of the perimeter of the first food container, on an opposite side of the first food container.

2. The food container stacking system of claim 1, further comprising:
- a second food container stacking device configured to lay on the top surface of the first food container and adjacent to the first food container stacking device, the second food container stacking device comprising:
  - a horizontal member, with a first longitudinal sinusoidal shaped side, a second longitudinal sinusoidal shaped side, a top surface, and a bottom surface, a first corner, second corner, third corner, and fourth corner;
  - a first pin removeably attachable to the first hole, and extending from the bottom surface;
  - a second pin removeably attachable to the second hole, and extending from the bottom surface;
  - a third pin removeably attachable to the third hole, and extending from the bottom surface;
  - a fourth pin removeably attachable to the fourth hole, and extending from the bottom surface;
- wherein the first and second pins are configured to lay outside of the perimeter of the first food container, and wherein the third and fourth pins are configured to lay outside of the perimeter of the first food container, on an opposite side of the first food container.

3. The food container stacking system of claim 1, further comprising:
- a second food container configured to lay on top of the first food container stacking device.

4. The food container stacking system of claim 2, further comprising:
- a second food container configured to lay on top of the first food container stacking device and the second food container stacking device.

\* \* \* \* \*

UNITED STATES PATENT AND TRADEMARK OFFICE
CERTIFICATE OF CORRECTION

PATENT NO.        : 9,027,755 B2                                              Page 1 of 1
APPLICATION NO.   : 14/464913
DATED             : May 12, 2015
INVENTOR(S)       : Marlon Jones It is certified that error appears in the above-identified patent and that said Letters Patent is hereby corrected as shown below:

In the claims:

COLUMN 4, LINE 54:
"second corner, third corner, and fourth corner;" should read --second corner, third corner, and fourth corner; a first hole through the top surface and bottom surface generally at the first corner; a second hole through the top surface and bottom surface generally at the second corner; a third hole through the top surface and bottom surface generally at the third corner; and a fourth hole through the top surface and bottom surface generally at the fourth corner;--

COLUMN 5, LINE 10:
"second corner, third corner, and fourth corner;" should read --second corner, third corner, and fourth corner; a first hole through the top surface and bottom surface generally at the first corner; a second hole through the top surface and bottom surface generally at the second corner; a third hole through the top surface and bottom surface generally at the third corner; and a fourth hole through the top surface and bottom surface generally at the fourth corner;--

COLUMN 5, LINE 30:
"a second food container configured to lay on top of the first" should read --a third food container configured to lay on top of the first--

Signed and Sealed this
Twenty-sixth Day of April, 2016

Michelle K. Lee
*Director of the United States Patent and Trademark Office*